US012577337B2

(12) United States Patent
Hauser et al.

(10) Patent No.: US 12,577,337 B2
(45) Date of Patent: Mar. 17, 2026

(54) METHOD TO PROCESS FLUORINATED THERMOPLASTIC ELASTOMERS

(71) Applicant: Arkema Inc., King of Prussia, PA (US)

(72) Inventors: Adam W. Hauser, King of Prussia, PA (US); Azaz A. Vahora, King of Prussia, PA (US); Mathieu Y. Capelot, King of Prussia, PA (US); Yves Deyrail, Aviron (FR); Francois Bargain, Bernay (FR)

(73) Assignee: Arkema Inc., King of Prussia, PA (US)

( * ) Notice: Subject to any disclaimer, the term of this patent is extended or adjusted under 35 U.S.C. 154(b) by 988 days.

(21) Appl. No.: 17/764,231

(22) PCT Filed: Oct. 2, 2020

(86) PCT No.: PCT/US2020/053890
§ 371 (c)(1),
(2) Date: Mar. 28, 2022

(87) PCT Pub. No.: WO2021/067660
PCT Pub. Date: Apr. 8, 2021

(65) Prior Publication Data
US 2022/0372185 A1 Nov. 24, 2022

Related U.S. Application Data

(60) Provisional application No. 62/909,829, filed on Oct. 3, 2019.

(51) Int. Cl.
| C08F 214/22 | (2006.01) |
| B29C 45/00 | (2006.01) |
| C08L 27/16 | (2006.01) |
| B29K 27/00 | (2006.01) |

(52) U.S. Cl.
CPC ........ C08F 214/22 (2013.01); B29C 45/0001 (2013.01); C08L 27/16 (2013.01); *B29K 2027/16* (2013.01); *B29K 2995/004* (2013.01); *C08L 2205/025* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 4,158,678 | A | 6/1979 | Tatemoto et al. |
| 4,210,774 | A | 7/1980 | Perry |
| 4,243,770 | A | 1/1981 | Tatemoto et al. |
| 4,360,652 | A | 11/1982 | Dohany et al. |
| 5,198,502 | A | 3/1993 | Tatemoto |
| 6,107,363 | A | 8/2000 | Gayer et al. |
| 6,107,393 | A | 8/2000 | Abusleme et al. |
| 6,207,758 | B1 | 3/2001 | Brinati et al. |
| 6,869,997 | B2 | 3/2005 | Wille et al. |
| 8,080,621 | B2 | 12/2011 | Amin-Sanayei et al. |
| 8,158,734 | B2 | 4/2012 | Amin-Sanayei et al. |
| 8,538,316 | B2 | 9/2013 | Shigeno et al. |
| 8,697,822 | B2 | 4/2014 | Durali et al. |
| 8,765,890 | B2 | 7/2014 | Amin-Sanayei et al. |
| 2002/0132947 | A1 | 9/2002 | Smith et al. |
| 2003/0204018 | A1 | 10/2003 | Granel et al. |
| 2005/0014900 | A1 | 1/2005 | Park |
| 2005/0222337 | A1 | 10/2005 | Park |
| 2008/0032080 | A1 | 2/2008 | Faulkner et al. |
| 2009/0203846 | A1* | 8/2009 | Park ........................ C08L 27/12 525/200 |
| 2011/0211890 | A1 | 9/2011 | Shigeno et al. |
| 2013/0288556 | A1 | 10/2013 | Moore et al. |
| 2014/0235783 | A1 | 8/2014 | Iida et al. |
| 2016/0177079 | A1 | 6/2016 | Bandi et al. |
| 2016/0194512 | A1 | 7/2016 | Bandi et al. |
| 2022/0025166 | A1 | 1/2022 | Hauser et al. |

FOREIGN PATENT DOCUMENTS

| | | | |
|---|---|---|---|
| EP | 0168020 B1 | 10/1989 | |
| EP | 0924257 A1 * | 6/1999 | .............. C08L 27/12 |
| JP | H05170909 A | 7/1993 | |
| JP | 2005088435 A2 | 4/2005 | |
| WO | 2014112252 A1 | 7/2014 | |
| WO | WO2015014699 A1 | 2/2015 | |
| WO | WO2018046355 A1 | 3/2018 | |
| WO | WO2018050688 A1 | 3/2018 | |
| WO | WO2018149757 A1 | 8/2018 | |
| WO | WO2020178303 A1 | 9/2020 | |

OTHER PUBLICATIONS

"Thermoplastic Polyurethane Elastomers," Handbook of Thermoplastic Elastomers, 2014, p. 246. (Year: 2014).*

* cited by examiner

*Primary Examiner* — Catherine S Branch
(74) *Attorney, Agent, or Firm* — Joanne Rossi

(57) ABSTRACT

An injection molding process to mold a fluorinated thermoplastic elastomeric polymer composition is disclosed. An article made using the process has little shrinkage.

18 Claims, No Drawings

METHOD TO PROCESS FLUORINATED THERMOPLASTIC ELASTOMERS

This application is a national stage application under 35 U.S.C. § 371 of PCT Application PCT/US2020/053890, filed 2 Oct. 2020; which claims benefit to U.S. Provisional Application 62/909,829, filed 3 Oct. 2019; said applications incorporated herein by reference.

FIELD OF THE INVENTION

The present invention relates to a process of processing a thermoplastic elastomeric composition based on fluoropolymers, and preferably on copolymers comprising vinylidene fluoride (VDF)-derived units and hexafluoropropene (HFP)-derived units. The processing of these fluorothermoplastic elastomers (F-TPE) make it possible to manufacture wearable or consumer electronics articles or article parts using conventional thermoplastic processing equipment.

BACKGROUND

Thermoplastic elastomers are a class of polymeric materials that behave as an elastomer at use temperature, but can be processed and recycled at elevated temperatures similar to a thermoplastic. To achieve these hybrid properties, at least one phase of the polymeric system often has low hardness, low Tg and/or a low crystallinity. As such, injection molding these materials comes with challenges; namely, maintaining part dimensions without specialty cooling systems.

Document WO2018046355 discloses a composition for a dynamically cured thermoplastic vulcanizate (TPV) which is a class of thermoplastic elastomer, but does not present a solution for injection molding said TPV. Similarly, documents WO2018050688, US20160177079, and US20160194512 disclose fluorinated thermoplastic elastomeric compositions without discussing solutions for injection molding parts of these compositions. Thus, there is a need for processes to reproducibly create quality parts with low shrinkage and modifiable surface structure.

To inject complex or useful parts from a TPE resin, one must understand the mechanism behind and be able to control the dimensional changes that occur with processing conditions. Residual stress in amorphous regions of a TPE is the key driving factor in the eventual part shrinkage. Likewise, the kinetics of crystallization in a semi-crystalline phase must be controlled so that crystallization occurs in the mold within a reasonable timeframe.

This is, perhaps, counterintuitive to what is generally thought to be responsible for shrinkage in semicrystalline polymers—that is, the crystallization itself. Indeed, the density change upon crystallization will contribute to a volume change in molded parts, but this will depend more intimately on the overall crystallinity and/or volume percent crystalline phase. It will not be the dominant factor in low crystallinity materials.

SUMMARY OF THE INVENTION

Disclosed is a process for injection molding thermoplastic elastomeric materials, preferably fluorinated thermoplastic elastomeric polymer compositions, with conventional injection molding equipment. The parts created from this process have very small dimensional changes upon ejection from the mold itself, and preferably sustain this part quality after exposure to elevated temperatures.

In the disclosed process, the mold temperatures are below the highest melt transition ($T_m$) of the fluorinated thermoplastic elastomeric polymer composition, preferably between the $T_c$ and the $T_m$, preferably 10-70° C. below the $T_m$, more preferably 10-60° C. below the $T_m$, even more preferably 10-40° C. below the $T_m$ of the thermoplastic elastomeric composition. Generally, cooling times for this process are greater than 60 sec, preferably 70 sec or greater, and can range from 70-1000 s, preferably from 80-900 s, even more preferably from 100 to 800 s. Generally, Barrel temperatures are between 30 and 220° C. above the $T_m$, preferably between 50-200° C. above $T_m$, and more preferably between 600-180° C. above the $T_m$.

The gate size of the mold should be maximized to reduce shear, thereby resulting in less shrinkage.

The runner path length feeding the mold should be minimized, but the cross-sectional area should be maximized to minimize the shear stress.

Fill speeds for this process range from 1-100 cm³/s preferably from 5-50 cm³/s.

Fluorinated thermoplastic elastomeric compositions that can be processed under these conditions include but are not limited to fluoropolymer thermoplastic elastomeric polymers, fluoropolymer thermoplastic elastomeric polymer blends, and fluoro-thermoplastic vulcanizates and F-TPE made via segmented block copolymerization. Examples of F-TPE made via segmented block copolymerization are described in documents U.S. Pat. Nos. 4,158,678, 4,243,770, 5,198,502, WO2018149757, WO2018050688, or U.S. Pat. No. 6,107,363. Examples of fluoro-thermoplastic vulcanizates are described in US20160177079, WO2015014699, US20160194512 and US2008032080.

Using the process of the present invention, fluorinated thermoplastic elastomeric compositions can be easily injection molded to make a part with less than 4.3% shrinkage, preferably less than 4%, more preferably less than 3% and even more preferably less than 2%.

In some embodiments, the thermoplastic elastomeric composition used in the present invention comprises a blend of uncrosslinked sufficiently high viscosity (or molecular weight) fluoropolymers "S" with uncrosslinked sufficiently high viscosity (or molecular weight) fluoropolymers "H". The blend of fluoropolymers comprises from 20 to 80 weight % of S and from 80 to 20 weight % H. Both Polymer S and polymer H are made without crosslinkers.

In one embodiment, the polymer H fluoropolymer of the first aspect is a homopolymer or copolymer having at least 70 weight percent of vinylidene fluoride monomer units. S is a fluoropolymer copolymer having at least 35 wt %, preferably at least 40 wt % HFP.

Aspects of the Invention

Aspect 1 of the invention is a process to mold a fluorinated thermoplastic elastomeric polymer composition, wherein the process comprises the steps of:

(I) providing a semicrystalline fluorinated thermoplastic elastomer polymer composition with a ΔH of formation between 1 and 30 J/g, preferably between 1 and 20 J/g, and more preferably between 1 and 10 J/g (II) injection molding the fluorinated thermoplastic elastomer polymer composition wherein (a) the barrel temperature is between 30 and 220° C. above the $T_m$, preferably between 50-200° C. above $T_m$, and more preferably between 60-180° C. above $T_m$, (b) the mold temperature is less than highest melt transition ($T_m$), preferably between the $T_c$ and the $T_m$, preferably 10-70° C. below the $T_m$, more preferably 10-60° C. below the $T_m$, even more preferably 10-40° C. below the $T_m$.

(c) the mold cooling time is greater than 60 sec, preferably from 70-1000 seconds, preferably from 80-900 seconds, even more preferable from 100-800 seconds.

Aspect 2: The process according to aspect 1 wherein the fluorinated thermoplastic elastomer polymer composition comprising a fluoropolymer blend, said blend comprising an elastomeric fluoropolymer and a thermoplastic fluoropolymer.

Aspect 3: The process according to aspect 1 or 2 wherein the $T_m$ of the fluorinated thermoplastic elastomeric polymer composition is greater than 40° C., preferably greater than 60° C. and more preferably greater than 80° C.

Aspect 4: The process according to any one of aspects 1 to 3 wherein the $T_m$ of the fluorinated thermoplastic elastomeric polymer composition is from 40° C. to 230° C., preferably from 60° C. to 200° C. and more preferably from 80° C. to 175° C.

Aspect 5: The process according to any one of aspects 1 to 4 wherein the $T_c$, is at least 0° C., preferably above 10° C., more preferably above 15° C., with the provision that Tc is at least 15° C. below the Tm for the given composition.

Aspect 6: The process according to any one of aspects 1 to 5 wherein the Tc can range from 0° C. to 215° C., preferably from 10° C. to 215° C., with the proviso that Tc is at least 15° C. below the Tm for the given composition.

Aspect 7: The process according to any one of aspects 1 to 6 wherein the $T_m$ of the composition is below 120° C., preferably below 100° C. and the $T_c$ is at least 0° C., preferably above 10° C., more preferably above 15° C., with the proviso that Tc is at least 15° C. below the Tm for the given composition.

Aspect 8: The process according to any one of aspects 1 to 7 wherein the fluoropolymer thermoplastic elastomer composition comprises a fluoropolymer blend comprising fluoropolymer S and fluoropolymer H wherein:

H is a fluoropolymer which comprises from 0 to 30 weight percent, preferably 15 to 30 wt percent, more preferably 20 to 30 wt percent of a monomer selected from the group consisting of HFP, fluorinated or perfluorinated vinyl ethers, 2,3,3,3-tetrafluoropropene, trifluoropropene, 1-chloro-3,3,3-trifluoro propene or combinations thereof;

S preferably comprises at least 35 weight percent, preferable at least 40 weight percent, most preferably at least 43 weight percent of a monomer selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof, and wherein the amount of H is from 20 to 80 weight % of the composition, and the amount of S is from 20 to 80 weight % of the composition Aspect 9: The process of aspect 8, wherein the melt viscosity of H is from 1-30 kP as measured at 230° C. at 100 s$^{-1}$ and the melt viscosity of S is from 10-55 kP as measured at 230° C. at 100 s$^{-1}$.

Aspect 10: The process of any one of aspects 8 to 9, wherein H comprises at least one monomer selected from the group consisting of vinylidene fluoride (VDF), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluorethylene, 1,1,1-trifluoropropene, 1,3,3,3-tetrafluoropropene, 2,3,3,3-tetrafluoropropene, 1-chloro-3,3,3-trifluoropropene, fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of C4 and higher, partially- or per-fluorinated cyclic alkenes of C3 and higher, fluorinated or partially fluorinated acrylates and methacrylates, and combinations thereof.

Aspect 11: The process of any one of aspects 8 to 10, wherein S comprises at least one monomer selected from the group consisting of vinylidene fluoride (VDF), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluorethylene, 1,1,1-trifluoropropene, 1,3,3,3-tetrafluoropropene, 2,3,3,3-tetrafluoropropene, 1-chloro-3,3,3-trifluoropropene, fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of C4 and higher, partially- or per-fluorinated cyclic alkenes of C3 and higher, fluorinated or partially fluorinated acrylates and methacrylates, and combinations thereof.

Aspect 12 The process of any one of aspects 8 to 11, wherein fluoropolymer H is a copolymer of VDF and HFP wherein the VDF comprises at least 70 wt percent of H and wherein fluoropolymer S is a copolymer of VDF and HFP wherein the HFP comprises at least 30 wt percent of S, preferably at least 40 weight present of S and more preferable at least 45 weight percent of S.

Aspect 13 The process of any one of aspects 8 to 12, wherein the amount of H is from 40 to 60 weight % of the composition, and the amount of S is from 60 to 40 weight % of the composition.

Aspect 14 The process of any one of aspects 8 to 13, wherein the total proportion of fluoropolymer(s) H plus S in the composition is at least 85 wt. %, preferably at least 90 wt. %, more preferably at least 95 wt. %.

Aspect 15 The process of any one of aspects 8 to 14, wherein the melt viscosity of the fluoropolymer blend, S plus H, is from 1000 to 4400 Pa·s, preferably from 1000 to 3000 Pa·s, more preferably from 800 to 2200 Pa·s, at a temperature of 230° C. and at a shear rate of 100 s$^{-1}$.

Aspect 16 The process according to any one of aspects 1 to 7 wherein the fluorinated thermoplastic elastomer polymer composition comprises a fluorinated thermoplastic vulcanizate (TPV).

Aspect 17 The process according to aspect 16 wherein TPV comprising a crosslinking agent selected from the group consisting of melamine resins, epoxy resins, di- or higher polyisocyanates, polyaziridines, polycarbodiimides polyoxazolines dialdehydes such as glyoxal, di- and trifunctional acetoacetates, malonates, acetals, thiols and acrylates, cycloaliphatic epoxy molecules, organosilanes such as epoxysilanes and amino silanes, carbamates, diamines, and triamines, inorganic chelating agents such as certain zinc and zirconium salts, titantes, glycourils and another aminoplasts, triallyl-cyanurate; triallyl-isocyanurate (TAIL); tris(diallylamine)-s-triazine; triallylphosphite; N,N-diallyl-acrylamide; fluorinated bis-olefins as defined hereinafter, N,N' bisallylbicycle-oct-7-ene-disuccinimide (BOSA); N,N,N'-tetraallyl-malonamide; trivinyl-isocyanurate; 2,4,6-trivinyl-methyltrisiloxane.

Aspect 18 The process according to any one of aspect 1 where the fluorinated thermoplastic elastomer polymer composition comprises a VDF and HFP based copolymer.

Aspect 19 An article made from the process of any one of aspects 1 to 18 wherein the out of the mold shrinkage is less than 4.3%, preferably 3% and more preferably less than 1% according to the test method.

Aspect 20 An article made from the process any one of aspects 1 to 19 wherein the article exhibits a shrinkage of less than 5%, preferably 3% and more preferably less than 1% after annealing the part at 65° C. for 72 h according to the test method.

Aspect 21 The article of any one of aspects 1 to 19, wherein, with shrinkage of less than 5%, preferably 3% and more preferably less than 1% after annealing the part at 80° C. for 72 h according to the test method.

Aspect 22 A process to mold a fluorinated thermoplastic elastomer, wherein the process comprises the steps of:
(I) Providing a semicrystalline polymer composition with a $\Delta H$ of formation between 1 and 10 J/g,
(II) Injection molding the polymer with:
(a) barrel temperatures between 50 and 200° C. above the $T_m$,
(b) mold temperatures below the melt transition ($T_m$), preferably between the $T_c$ and the $T_m$, more preferably 10-60° C. below the $T_m$.
(c) mold cooling times from 70-800 s.
wherein the fluorinated thermoplastic elastomer comprises a blend of a H polymer and a S polymer in a ratio of from 20% to 80% H.

Aspect 23 The process of aspect 22 wherein H comprises a copolymer comprising vinylidene fluoride and HFP and S comprises copolymer comprising vinylidene fluoride and HFP.

DETAILED DESCRIPTION OF THE INVENTION

All references listed in this application are incorporated herein by reference. All percentages in a composition are weight percent, unless otherwise indicated.

The term "polymer" is used to mean both homopolymers, copolymers and terpolymers (three or more monomer units), unless otherwise stated. Any copolymer or terpolymer can be random, blocky, or gradient, and the polymer can be linear, branched, star-shaped, comb-shaped or of any other morphology.

In the context of the present application, unless otherwise indicated, all viscosities are melt viscosities which are measured at a temperature of 230° C. and at a shear rate of 100 s$^{-1}$. More specifically, melt viscosities may be measured by a Dynisco LCR 7000 capillary rheometer. Measurements are performed at 230° C. with shear rates ranging from 10 to 3000 s$^{-1}$, with the viscosity recorded at 100 s$^{-1}$.

The $T_c$ and $T_m$ are identified via differential scanning calorimetry (DSC) with a heating/cooling rate of 10° C./min by the first cool and second heat, respectively. The $\Delta H$ of formation is defined by integrating the endothermic area in the heat flow curve during the second heat ($T_m$) or exothermic area during the first cool ($T_a$) and dividing by the temperature ramp rate and sample mass.

All References to the $T_m$, refer to the highest melt transition temperature of the fluorinated thermoplastic elastomeric polymer composition unless otherwise indicated. All references to the Tc refer to the lowest crystallization temperature of the fluorinated thermoplastic elastomeric polymer composition unless otherwise indicated.

Semicrystalline means the thermoplastic elastomeric polymer composition has a $\Delta H$ of formation of between 1 and 60 J/g, Shrinkage Test: Shrinkage is defined by the percent of 1-dimensional length change of a Type I ASTM tensile bar from the mold size of 165 mm, and is measured simply with calipers with sensitivity of at least 0.1 mm. Out of the mold shrinkage is measured 24 h after de-molding, during which time the tensile bar is at ambient temperature (20-25° C.). Unless over wise indicated shrinkage refers to out of the mold shrinkage (article is not annealed).

Annealing Procedure. After removing the article from the mold, the article is heated to an indicated temperature for an indicated time, and then measured 24 hours after removing from the annealing heat according to the above shrinkage test. "Annealing shrinkage".

By "elastomer" is herein meant a material having an elastic recovery of at least 80%, preferably at least 90%, when subjected to a stress/relaxation protocol according to ASTM standard, Special Bulletin No. 184. This protocol is applied on a tensile bar defined by ASTM D638. This sample is submitted to a tensile deformation of 100% applied at 25° C. 100% deformation is maintained for 5 minutes and the sample is then released. After 5 minutes of relaxation the residual deformation is measured. The elastic recovery is defined as the initial sample length minus the residual deformation. The tensile protocol is carried out with an Instron model 4201, 4202 or the like equipped with a 100 or 200 lb load cell.

Fluorinated thermoplastic elastomeric means polymeric materials, which exhibit elasticity at ambient temperatures and can be processed as plastics by melt processing techniques. Example fluorinated thermoplastic elastomeric (TPE) materials include blends (generally a thermoplastic with an elastomer), TPVs and block copolymers, which contain one or more blocks that are thermoplastic and one or more blocks that are elastomeric.

The invention provides a process to injection mold a fluorinated thermoplastic elastomeric polymer composition, wherein the process comprises the steps of:
(I) providing a semicrystalline fluorinated thermoplastic elastomeric polymer composition with a $\Delta H$ of formation between 1 and 30 J/g, preferably between 1 and 20 J/g, and more preferably between 1 and 10 J/g
(II) injection molding the fluorinated thermoplastic elastomeric polymer composition wherein
(a) the barrel temperature is between 30 and 220° C. above the $T_m$, preferably between 50-200° C. above $T_m$, and more preferably between 60-180° C. above $T_m$ of the fluorinated thermoplastic elastomeric polymer composition,
(b) the mold temperature is at less than the highest melt transition ($T_m$), preferably between the $T_c$ and the $T_m$, preferably 10-70° C. below the $T_m$, more preferably 10-60° C. below the $T_m$, even more preferably 10-40° C. below the $T_m$, and (c) the mold cooling time is greater than 60 sec, greater than 70 sec, from 70-1000 seconds, preferably from 80-900 seconds, even more preferable from 80-800 or 100-800 seconds.

The invention provides for an article of manufacture made by the disclosed process.

The inventive process results in an article that exhibits low out of the mold shrinkage. Preferably the out of the mold shrinkage is than 4.3% or less, less than 4% less than 3%, more preferably less than 1% as measure by the shrinkage test.

The barrel temperature is above the melting point of the thermoplastic elastomeric composition. Preferably, the barrel temperature is at least 30° C. above and preferably at least 50° C. above the $T_m$ to ensure that the fluorinated thermoplastic elastomeric polymer composition will flow into the mold with low residual flow induced stress.

Two kinds of residual stresses in molding of concern are flow induced stress and thermal induced stress. Flow induced residual stress happens when polymer experiences shear during processing. When in a molten state, polymer molecules are unstressed, and tend to be in random coil state. During processing, the polymer can experience shear and elongation, and the molecules become oriented in the flow direction. If solidification occurs before the polymer molecules are fully relaxed to their random coil state, molecular orientation is locked within the molded part.

The polymer may also experience thermal induced residual stress during processing which arises during cooling. Polymers shrink as they cool. During cooling, the polymer cools at different rates from the mold wall to the center. When the polymer starts to cool, the external surface starts to shrink, while the bulk of polymer at the core is still hot and free to contract. As the internal core cools, its contraction is constrained by the external layers since they are already rigid.

It is critical that the mold temperature is below the highest melt transition ($T_m$), preferably the mold temperature is between the Tc and the Tm of the fluorinated thermoplastic elastomeric polymer composition, more preferably 10-70° C. below the $T_m$. This ensures that the fluorinated thermoplastic elastomeric polymer composition will solidify before removing from the mold.

The mold cooling time is greater than 60 sec, preferably 70 sec or greater and more preferable 80 sec or greater and preferably, the cooling time is less than 1000 sec. The cooling time can be from 70-1000 seconds, or 80 to 900 sec or 100 to 800 sec. Too short a cooling time will not allow the part to significantly solidify. Too short a cooling time will result in an increase in shrinkage.

The combination of the mold temperature and the cooling time allow for appropriate crystallization in the fluorinated thermoplastic elastomeric polymer composition. This provides for a molded part that maintains is shape and size after demolding.

The thermoplastic elastomeric polymer composition that can be molded according to the invention can be blends of at least two fluoropolymer polymers wherein one fluoropolymer is an elastomeric and the other is a thermoplastic. The blend may or may not contain a crosslinker. If the blend contains a crosslinker is it usually referred to as a TPV. Such crosslinkers are known in the art.

The $T_m$ of the fluorinated thermoplastic elastomeric polymer composition is greater than 40° C., preferably greater than 60° C. and more preferably greater than 80° C. The Tm can range from 40° C. to 230° C., preferably from 60° C. to 200° C. and more preferably from 80° C. to 170° C.

The crystallization temperature of the fluorinated thermoplastic elastomeric polymer composition, $T_c$, is at least 0° C., preferably above 10° C., more preferably above 15° C. The Tc can range from 0° C. to 170° C., preferably from 10° C. to 170° C., with the proviso that Tc is at least 15° C. below the Tm for the given fluorinated thermoplastic elastomeric polymer composition.

In one embodiment, the $T_m$ of the fluorinated thermoplastic elastomeric polymer composition is below 120° C., preferably below 100° C. and crystallization temperature, $T_c$, is at least 0° C., preferably above 10° C., more preferably above 15° C. with the proviso that Tc is at least 15 C below the Tm for the given fluorinated thermoplastic elastomeric polymer composition.

Example thermoplastic elastomeric polymer compositions are found in WO201804635, WO2018050688, US20160177079, US20160194512. Such compositions can be processed by the present invention.

One thermoplastic elastomeric polymer composition used in the present invention comprises a blend of uncrosslinked sufficiently high melt viscosity fluoropolymers "S" with uncrosslinked sufficiently high melt viscosity fluoropolymers "H". The blend of fluoropolymers comprises from 20 to 80 weight % of S and from 80 to 20 weight % H. Both Polymer S and polymer H are made without crosslinkers.

Fluoropolymer H: Polymer H can be a homopolymer or a copolymer containing greater than 50 wt % fluoromonomers.

The polymer, H, is a fluoropolymer which comprises from 0 to 30 weight percent, preferably 15 to 30 wt percent, more preferably 20 to 30 wt percent of a monomer selected from the group consisting of HFP, fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), trifluoropropene, 1-chloro-3,3,3-trifluoro propene, longer chain perfluorinated vinyl ethers and 2,3,3,3-tetrafluoropropene, or combinations thereof.

In one embodiment H is preferably a homopolymer, or a copolymer with from 70-100 wt % fluoromonomer comprising from 0-30 wt % HFP, and has a melt viscosity from 1-30 kP, preferably 4-20 kP as measured at 230° C. at 100 $s^{-1}$.

The fluoropolymers of the invention, H, include, but are not limited to polymers containing at least 50 weight percent of one or more fluoromonomers. The term "fluoromonomer" as used according to the invention means a fluorinated and olefinically unsaturated monomer capable of undergoing free radical polymerization reaction. Suitable exemplary fluoromonomers for use according to the invention include, but are not limited to, vinylidene fluoride (VDF), tetrafluoroethylene (TFE), trifluoroethylene (TrFE), chlorotrifluoroethylene (CTFE), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluoroethylene, 1,1,1-trifluoropropene, 1,3,3,3-tetrafluoropropene, 1-chloro-3,3,3-trifluoropropene, fluorinated dioxoles, partially- or per-fluorinated alpha olefins of C4 and higher, partially- or per-fluorinated cyclic alkenes of C3 and higher, and fluorinated or partially fluorinated acrylates and methacrylates, and combinations thereof. Fluoropolymers used in the practice of the present invention include the products of polymerization of the fluoromonomers listed above, for example, the homopolymer made by polymerizing vinylidene fluoride (VDF) by itself, or a copolymer made by polymerizing vinylidene fluoride (VDF) with hexafluoropropene (HFP).

Fluoro-terpolymers are also contemplated, including terpolymers such as those having tetrafluoroethylene, hexafluoropropene and vinylidene fluoride monomer units. Most preferably the fluoropolymer is a polyvinylidene fluoride (PVDF) polymer homopolymer or copolymer. The invention will be exemplified in terms of PVDF, but one of ordinary skill in the art will recognize that other fluoropolymers could be represented where the term PVDF is exemplified.

Polymer H is preferable a polyvinylidene fluoride (PVDF) polymer. PVDF can be a homopolymer, copolymer or polymer alloy. Polyvinylidene fluoride polymers H of the invention include the homopolymer made by polymerizing vinylidene fluoride (VDF), and copolymers, terpolymers and higher polymers of vinylidene fluoride, where the vinylidene fluoride units comprise greater than 51 percent by weight, preferably 70 percent of the total weight of all the monomer units in the polymer, and more preferably, comprise greater than 75 percent of the total weight of the monomer units. Copolymers, terpolymers and higher polymers (generally referred to herein as "copolymers") of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene, and fluorinated or partially fluorinated acrylates or methacrylates. Preferred copolymers or terpolymers are formed with vinyl fluoride, 2,3,3,3-tetrafluoropropene, trifluoroethene, tetrafluoroethene (TFE), and hexafluoropropene (HFP).

Preferred copolymers for polymer H include those comprising from about 70 to about 99 weight percent VDF, and correspondingly from about 1 to about 30 weight percent HFP, and preferably a level of HFP of 15 to 30 weight percent; terpolymers of VDF/HFP/TFE; and copolymers of VDF and TFE.

For polymer H, it is preferred that all monomer units be fluoromonomers, however, copolymers of fluoromonomers with non-fluoromonomers are also contemplated by the invention. In the case of a copolymer containing non-fluoromonomers, at least 60 percent by weight of the monomer units are fluoromonomers, preferably at least 70 weight percent, more preferably at least 80 weight percent, and most preferably at least 90 weight percent are fluoromonomers. Useful comonomers include, but are not limited to, ethylene, propylene, styrenics, acrylates, methacrylates, vinyl esters, vinyl ethers, non-fluorine-containing halogenated ethylenes, vinyl pyridines, and N-vinyl linear and cyclic amides.

Fluoropolymer S: The fluoropolymers of the invention, S, preferably comprise at least 35 weight percent, preferable at least 40 weight percent, most preferably at least 43 weight percent selected from the group consisting of hexafluoropropene (HFP), fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers and 2,3,3,3-tetrafluoropropene, trifluoropropene, 1-chloro-3,3,3-trifluoro propene or combinations thereof. Preferably, the monomer selected from the group is from 35 wt % to 70 wt %, preferably 40 to 70 wt percent, more preferably from 43 to 70 wt percent. The remaining weight percent is preferably made up of other fluoromonomers. The term "fluoromonomer" as used according to the invention means a fluorinated and olefinically unsaturated monomer capable of undergoing free radical polymerization reaction. Suitable exemplary fluoromonomers for use according to the invention include, but are not limited to, vinylidene fluoride (VDF), tetrafluoroethylene (TFE), trifluoroethylene (TrFE), chlorotrifluoroethylene (CTFE), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluoroethylene, 1,1,1-trifluoropropene, 2,3,3,3-tetrafluoropropene, 1,3,3,3-tetrafluoropropene, 1-chloro-3,3,3-trifluoropropene, fluorinated dioxoles, partially- or per-fluorinated alpha olefins of C4 and higher, partially- or per-fluorinated cyclic alkenes of C3 and higher, fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, and fluorinated or partially fluorinated acrylates and methacrylates, and combinations thereof. Fluoropolymer S used in the practice of the present invention include the products of polymerization of the fluoromonomers listed above, for example, a copolymer made by polymerizing vinylidene fluoride (VDF) with hexafluoropropene (HFP).

Fluoro-terpolymers are also contemplated, including terpolymers such as those having tetrafluoroethylene, hexafluoropropene and vinylidene fluoride monomer units.

Polymer S is preferable a vinylidene fluoride (VDF) hexafluoropropene (HFP) copolymer. S can be a copolymer or polymer alloy. Polyvinylidene fluoride polymers S of the invention include the copolymers, terpolymers and higher polymers of hexafluoropropene (HFP), where the hexafluoropropene (HFP) units comprise greater than 35 percent by weight, preferably 40 percent, more preferably 43 weight percent of the total weight of all the monomer units in the polymer. The HFP monomers unit can comprise as much as 70 weight percent of the total weight of all the monomer units in the polymer S. Copolymers, terpolymers and higher polymers (generally referred to herein as "copolymers") of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP).

Preferred copolymers for polymer S include those comprising from about 35 to about 70 weight percent HFP, and correspondingly from about 65 to about 30 weight percent VDF, and preferably a level of HFP of 40 to 55 weight percent and from about 60 to about 45 weight percent VDF; and terpolymers of VDF/HFP/TFE.

In one embodiment of the invention, for polymer S, it is preferred that all monomer units be fluoromonomers, however, copolymer of fluoromonomers with non-fluoromonomers are also contemplated by the invention. In the case of a copolymer containing non-fluoromonomers, at least 60 percent by weight of the monomer units are fluoromonomers, preferably at least 70 weight percent, more preferably at least 80 weight percent, and most preferably at least 90 weight percent are fluoromonomers. Useful comonomers include, but are not limited to, ethylene, propylene, styrenics, acrylates, methacrylates, vinyl esters, vinyl ethers, non-fluorine-containing halogenated ethylenes, vinyl pyridines, and N-vinyl linear and cyclic amides.

Polymer S has a melt viscosity of from 10 to 55 kP, preferably 15-55 kP, more preferably 20-50 kP, even more preferably 25-50 kP, most preferably 30-50 kP.

In a preferred embodiment, the polymer S comprises greater than 30 weight percent HFP and up to 70 weight percent HFP, more preferably from greater than 40% to 70 wt % HFP.

In one embodiment 5 is a copolymer of 30-65 wt % VDF (vinylidene fluoride) and 35-70 wt % HFP with a viscosity from 10-55 kP, preferably 15-55 kP, more preferably 20-50 kP, even more preferably 25-50 kP, most preferably 30-50 kP.

The at least one fluoropolymer S (i.e. either the single fluoropolymer S or the mixture of fluoropolymers S) preferably has low or no crystallinity, which is characterized by a heat of fusion calculated from the first endotherm detected in a differential scanning calorimeter (DSC) scan of less than 20 J/g, preferably less than 15 J/g and even more preferably less than 10 J/g. DSC scans are performed according to ASTM D 451-97 using a DSC apparatus. The instrument is equipped with a dry box with a nitrogen purge through the dry box. Specimens of 9 to 10 mg are used and crimped in aluminum pans. The DSC run is begun at –50° C., followed by a 10° C./min ramp to 210° C.

The fluorinated thermoplastic elastomeric polymer composition is prepared by combining polymer S with polymer H in a ratio from 20 to 80 weight percent of S with from 80 to 20 weight percent of polymer H; preferably from 25 to 75 weight percent of S with from 75 to 25 weight percent of polymer H; more preferably from 60 to 40 weight percent of S with from 40 to 60 weight percent of polymer H; based on total weight of H and S combined. In one embodiment, the blend is prepared by combining or mixing a latex of S with a latex of H in the desired proportion. The fluoropolymers S and H can also be in the form of a powder when combined together.

In one embodiment the thermoplastic elastomeric fluoropolymer composition comprises a fluoropolymer blend comprising fluoropolymer S and fluoropolymer H wherein: H is a fluoropolymer which comprises from 0 to 30 weight percent, preferably 15 to 30 wt percent, more preferably 20 to 30 wt percent of a monomer selected from the group consisting of HFP, fluorinated or perfluorinated vinyl ethers, 2,3,3,3-tetrafluoropropene, trifluoropropene, 1-chloro-3,3,3-trifluoro propene or combinations thereof; and S preferably comprise at least 35 weight percent, preferable at least 40 weight percent, most preferably at least 43 weight percent selected from the group consisting of hexafluoropropene (HFP), fluorinated or perfluorinated vinyl ethers, 2,3,3,3-tetrafluoropropene, trifluoropropene, 1-chloro-3,3,3-trifluoro propene or combinations thereof, wherein the amount of H is from 20 to 80 weight % of the composition, and the amount of S is from 20 to 80 weight % of the composition.

One fluorinated thermoplastic elastomeric polymer composition that can be processed according to the present invention is a composition comprising a fluoropolymer blend comprising fluoropolymer S and fluoropolymer H, where H is a fluoropolymer comprising vinylidene fluoride and less than 30 weight percent HFP; S is a vinylidene fluoropolymer comprising greater than 35 weight percent HFP, and the amount of H is from 20 to 80 weight % of the composition, and the amount of S is from 20 to 80 weight % of the composition.

The at least one fluoropolymer S (i.e. either the single fluoropolymer S or the mixture of fluoropolymers S) is preferably an elastomer.

If more than one fluoropolymer S is present in the fluorinated thermoplastic elastomeric polymer composition, the viscosity values mentioned herein are those of the corresponding mixture of fluoropolymers S, in the same relative proportions as would be in the composition.

If more than one fluoropolymer H is present in the fluorinated thermoplastic elastomeric polymer composition, the viscosity values mentioned herein are those of the corresponding mixture of fluoropolymers H, in the same relative proportions as would be in the composition.

Production of fluoropolymer is well known to those of skill in the art. The fluoropolymer can be produced via suspension polymerization, emulsion polymerization, solution polymerization, bulk polymerization, or solution assisted suspension or emulsion polymerization. The reaction to produce the latex for polymer H and polymer S are known to those skilled in the art and by example are disclosed in, for example, U.S. Pat. Nos. 4,360,652, 6,869, 997, 8,080,621, 8,158,734, 8,697,822, 8,765,890 and many others, the contents of such patents are herein incorporated by reference. Preferably, no fluorosurfactant is used in the polymerization process.

Other Additives

The fluorinated thermoplastic elastomeric polymer composition used in the invention may also include typical additives, including, but not limited to, dyes; pigments; colorants; impact modifiers; antioxidants; flame-retardants; ultraviolet stabilizers; flow aids; conductive additives such as metals, carbon black and carbon nanotubes; defoamers; waxes; solvents; rheology modifiers such as plasticizers; surfactants; fillers (including nanofillers), and anti-static agents. Other additives that provide whitening could also be added to the fluorinated thermoplastic elastomeric polymer composition, including, but not limited to metal oxide fillers, such as zinc oxide; phosphate or phosphite stabilizers; and phenolic stabilizers. Any residual additives used for synthesizing the at least one fluoropolymer H or S or other polymers which may be present Plasticizers are defined in the Encyclopedia of Polymer Science and Engineering (Wiley and Sons, 1989), on p. 568-569 and p. 588-593. They can be monomeric or polymeric. Dibutyl-sebacate, dioctyl-phthalate, N-n-butylsulfonamide, polymeric polyesters and combinations thereof are examples of suitable plasticizers. Suitable polymeric polyesters may be for example derived from adipic, azelaic or sebacic acids and diols, and combinations thereof. Their molecular weight is preferably at least 1500 g/mol, more preferably at least 1800 g/mol.

When additives are present, they are preferably present in an amount of from 0.1 to 10 wt % in the fluorinated thermoplastic elastomeric polymer composition, more preferably of from 0.2 to 5 wt %, and most preferably of from 0.5 to 3 wt. % for each additive.

Crosslinking Agents

In a TPV, a crosslinker is used in the elastomeric portion of the TPV. The crosslinking agent is used in addition to a radical generator if a radical mechanism is used. The cross-linking agents which can be used include but are not limited to melamine resins, epoxy resins, di- or higher polyisocya-nates, polyaziridines, polycarbodiimides, polyoxazolines, dialdehydes such as glyoxal, di- and trifunctional acetoac-etates, malonates, acetals, thiols and acrylates, cycloali-phatic epoxy molecules, organosilanes such as epoxysilanes and amino silanes, carbamates, diamines, and triamines, inorganic chelating agents such as certain zinc and zirco-nium salts, titantes, glycourils and another aminoplasts triallyl-cyanurate; triallyl-isocyanurate (TAIL); tris(dial-lylamine)-s-triazine; triallylphosphite; N,N-diallyl-acrylam-ide; fluorinated bis-olefins as defined hereinafter, N,N' bisal-lylbicycle-oct-7-ene-disuccinimide (BOSA); N,N,N'-tetraallyl-malonamide; trivinyl-isocyanurate; 2,4,6-trivinyl-methyltrisiloxane, etc. A crosslinking agent or a mixture of the crosslinking agents above mentioned can be utilized.

Articles

The present inventive process can be used to overmold various other objects or parts.

The inventive process can be used to make articles. For instance, band-like or plate-like articles. The articles of the invention may in particular be selected from wearable articles and consumer electronics articles. In particular, embodiments, the articles are intended to be in contact with the human body and more specifically with human skin.

Other articles that may be made include supports for sensors, supports for electronic devices, casings, belts, gloves, pads, strips and bands.

Flexible parts for equipment such as diaphragms, o-rings, and seals can be made using the inventive process.

Parts used in overmolding.

Examples

Table 1 shows a fluorinated TPE blend with a $T_m$ of 83° C., a $T_c$ of 20° C. and a $\Delta H$ for $T_m$ of 7 J/g injected with different conditions, and the resulting part shrinkage. All samples were made on an injection molder with an injection speed of 5 cm³/s with an ASTM Type I tensile bar mold.

| Example | Barrel Temp (° C.) | Mold temp (° C.) | Hold Time (s) | Out of the mold Shrinkage (%) | Annealing Shrinkage after 72 h at 65° C., 90% RH |
|---|---|---|---|---|---|
| 1 | 150 | 20 | 200 | 0.5 | 4.9 |
| 2 | 150 | 40 | 400 | 0.7 | 3.2 |
| 3 | 180 | 20 | 200 | 0.3 | 2.9 |
| 4 | 180 | 40 | 350 | 0.7 | 2.0 |
| 5 | 180 | 65 | 700 | 1.0 | 1.8 |
| 6-Control | 180 | 40 | 20 | 9.0 | — |
| 7-Control | 180 | 40 | 60 | 4.4 | — |
| 8 | 180 | 40 | 150 | 1.3 | — |
| 9 | 180 | 40 | 400 | 0.5 | — |
| 10-Control | 230 | 20 | 50 | 4.4 | — |
| 11 | 230 | 20 | 100 | 1.3 | — |
| 12 | 230 | 20 | 200 | 0.2 | 1.2 |

This data show that by following the invention, thermoplas-tic elastomeric compositions can be molded and have a shrinkage of less than 4.3%, even less than 3%, or even less than 2% out of the mold. Shrinkage of the parts after annealing at 72 hrs at 65 C and 90% relative humidity, remains less than 5%.

Examples 1, 3 and 12 show as Barrel temperature increases out of the mold shrinkage and annealing shrinkage decreases.

Looking at examples 6 to 9, the trend shows less shrinkage as the hold time is increased.

The invention claimed is:

1. A process to mold a fluorinated thermoplastic elasto-meric polymer composition, wherein the process comprises the steps of:
    a. providing a semicrystalline fluorinated thermoplastic elastomeric polymer composition with a $\Delta H$ of forma-tion between 1 and 30 J/g,
    b. injection molding the fluorinated thermoplastic elasto-meric polymer composition wherein
        i. the barrel temperature is between 3° and 200° C. above the $T_m$,
        ii. the mold temperature is less than melt transition $(T_m)$,
        iii. the mold cooling time is greater than 60 sec.
    wherein the $T_m$ of the composition is below 120° C., and the crystallization temperature of the composition $(T_c)$ is at least 0° C., with the proviso that Tc is at least 15° C. below the $T_m$ for the given composition.

2. The process according to claim 1 wherein the fluori-nated thermoplastic elastomeric polymer composition com-prising a fluoropolymer blend, said blend comprising an elastomeric fluoropolymer and a thermoplastic fluoropoly-mer.

3. The process according to claim 1, wherein the $T_m$ of the fluorinated thermoplastic elastomeric polymer composition is greater than 40° C.

4. The process according to claim 3, wherein the fluo-ropolymer thermoplastic elastomeric polymer composition comprises a fluoropolymer blend comprising fluoropolymer S and fluoropolymer H wherein:
    H is a fluoropolymer which comprises from 0 to 30 weight percent of a monomer selected from the group consist-ing of HFP, fluorinated or perfluorinated vinyl ethers, 2,3,3,3-tetrafluoropropene, trifluoropropene, 1-chloro-3,3,3-trifluoro propene or combinations thereof;

S comprises at least 35 weight percent, of a monomer selected from the group consisting of hexafluoropro-pene (HFP), fluorinated or perfluorinated vinyl ethers, 2,3,3,3-tetrafluoropropene, trifluoropropene, 1-chloro-3,3,3-trifluoro propene or combinations thereof, and wherein the amount of H is from 20 to 80 weight % of the composition, and the amount of S is from 20 to 80 weight % of the composition.

5. The process of claim 4, wherein the melt viscosity of H is from 1-30 kP as measured at 230° C. at 100 s$^{-1}$ and the melt viscosity of S is from 10-55 kP as measured at 230° C. at 100 s$^{-1}$.

6. The process of claim 4, wherein H comprises at least one monomer selected from the group consisting of vinylidene fluoride (VDF), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluoroethylene, 1,1,1,-trifluoropropene, 1,3,3,3-tetrafluoropropene, 2,3,3,3-tetrafluoropropene, 1-chloro-3,3,3-trifluoropropene, fluorinated or perfluorinated vinyl ethers, fluorinated dioxoles, partially- or per-fluorinated alpha olefins of C4 and higher, partially- or per-fluorinated cyclic alkenes of C3 and higher, fluorinated or partially fluorinated acrylates, fluorinated or partially fluorinated methacrylates, and combinations thereof.

7. The process of claim 4, wherein S comprises at least one monomer selected from the group consisting of vinylidene fluoride (VDF), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluoroethylene, 1,1,1,-trifluoropropene, 1,3,3,3-tetrafluoropropene, 2,3,3,3-tetrafluoropropene, 1-chloro-3,3,3-trifluoropropene, fluorinated or perfluorinated vinyl ethers, fluorinated dioxoles, partially- or per-fluorinated alpha olefins of C4 and higher, partially- or per-fluorinated cyclic alkenes of C3 and higher, fluorinated or partially fluorinated acrylates, fluorinated or partially fluorinated methacrylates, and combinations thereof.

8. The process of claim 4, wherein fluoropolymer H is a copolymer of VDF and HFP, wherein fluoropolymer H comprises at least 70 wt percent of VDF, and wherein fluoropolymer S is a copolymer of VDF and HFP, wherein fluoropolymer S comprises at least 30 wt percent of HFP.

9. The process of claim 4, wherein the amount of H is from 40 to 60 weight % of the composition, and the amount of S is from 60 to 40 weight % of the composition.

10. The process of claim 4, wherein the total proportion of fluoropolymer(s) H plus S in the composition is at least 85 wt. %.

11. The process of claim 4, wherein the melt viscosity of the fluoropolymer blend, S plus H, is from 1000 to 4400 Pa·s, at a temperature of 230° C. and at a shear rate of 100 s$^{-1}$.

12. The process according to claim 1, wherein the fluorinated thermoplastic elastomeric polymer composition comprises a fluorinated thermoplastic vulcanizate (TPV).

13. The process according to claim 12, wherein the TPV comprises a crosslinking agent selected from the group consisting of melamine resins, epoxy resins, di- or higher polyisocyanates, polyaziridines, polycarbodiimides, poly-oxazolines, dialdehydes, di- and trifunctional acetoacetates, malonates, acetals, thiols, acrylates, cycloaliphatic epoxy molecules, organosilanes, carbamates, diamines, and tri-amines, inorganic chelating agents, titantes, glycourils, another aminoplasts, triallyl-cyanurate; triallyl-isocyanurate (TAIC); tris(diallylamine)-s-triazine; triallylphosphite; N,N-diallyl-acrylamide; fluorinated bis-olefins, N,N' bisallylbi-cycle-oct-7-ene-disuccinimide (BOSA); N,N,N'-tetraallyl-malonamide; trivinyl-isocyanurate; and 2,4,6-trivinyl-methyltrisiloxane.

14. The process according to claim 1, wherein the fluorinated thermoplastic elastomeric polymer composition comprises a VDF and HFP based copolymer.

15. A process to mold a fluorinated thermoplastic elastomeric composition, wherein the process comprises the steps of:
  a. Providing a semicrystalline polymer composition with a ΔH of formation between 1 and 10 J/g,
  b. Injection molding the polymer with:
    i. barrel temperatures between 5° and 200° C. above the $T_m$,
    ii. mold temperatures below the melt transition ($T_m$), preferably between the $T_c$ and the $T_m$, more preferably 10-60° C. below the $T_m$,
    iii. mold cooling times from 80-800 sec,
wherein the fluorinated thermoplastic elastomeric composition comprises a blend of a H polymer and a S polymer in a ratio of from 20% to 80% H, wherein the $T_m$ of the composition is below 120° C., and the $T_c$ is at least 0° C., with the proviso that Tc is at least 15° C. below the $T_m$ for the given composition.

16. The process of claim 15 wherein H comprises a copolymer comprising vinylidene fluoride and HFP and S comprises copolymer comprising vinylidene fluoride and HFP.

17. The process of claim 1, wherein fluoropolymer H comprises a copolymer comprising vinylidene fluoride and HFP and fluoropolymer S comprises a copolymer comprising vinylidene fluoride and HFP.

18. A process to mold a fluorinated thermoplastic elastomeric polymer composition, wherein the process comprises the steps of:
  a. providing a semicrystalline fluorinated thermoplastic composition with a AH of formation between 1 and 30 J/g, elastomeric polymer
  b. injection molding the fluorinated thermoplastic elastomeric polymer composition wherein
    i. the barrel temperature is between 30 and 200° C. above the $T_m$,
    ii. the mold temperature is less than melt transition ($T_m$),
    iii. the mold cooling time is greater than 60 sec;
wherein the $T_m$ of the fluorinated thermoplastic elastomeric polymer composition is greater than 40° C. and the fluoropolymer thermoplastic elastomeric polymer composition comprises a fluoropolymer blend comprising fluoropolymer S and fluoropolymer H wherein: wherein fluoropolymer H is a copolymer of vinylidene fluoride (VDF) and hexafluoropropene (HFP) and comprises at least 70 wt % percent of VDF, and from 0 to 30 wt % of HFP, and
fluoropolymer S is a copolymer of VDF and HFP, and comprises at least 35 weight percent of HFP, and wherein the amount of His from 20 to 80 weight % of the composition, and the amount of S is from 20 to 80 weight % of the composition.

* * * * *